United States Patent
Angerer et al.

(10) Patent No.: US 7,859,871 B2
(45) Date of Patent: Dec. 28, 2010

(54) METHOD FOR CONTROLLING INVERTERS

(75) Inventors: Christian Angerer, Sierning (AT);
Hannes Heigl, Prambachkirchen (AT);
Harald Kreuzer, Linz/Donau (AT)

(73) Assignee: Fronius International GmbH,
Pettenbach (AT)

( * ) Notice: Subject to any disclaimer, the term of this patent is extended or adjusted under 35 U.S.C. 154(b) by 137 days.

(21) Appl. No.: 12/310,291

(22) PCT Filed: Jul. 17, 2007

(86) PCT No.: PCT/AT2007/000350
§ 371 (c)(1),
(2), (4) Date: Feb. 19, 2009

(87) PCT Pub. No.: WO2008/028203
PCT Pub. Date: Mar. 13, 2008

(65) Prior Publication Data
US 2009/0251933 A1    Oct. 8, 2009

(30) Foreign Application Priority Data
Sep. 4, 2006 (AT) .............................. A 1470/2006

(51) Int. Cl.
*H02M 7/48* (2007.01)
(52) U.S. Cl. .......................................... 363/71; 363/72
(58) Field of Classification Search .................. 363/40, 363/55, 71, 72, 95, 109, 120
See application file for complete search history.

(56) References Cited
U.S. PATENT DOCUMENTS
4,328,429 A    5/1982    Kublick 5,212,630 A    5/1993    Yamamoto et al.

(Continued)

FOREIGN PATENT DOCUMENTS
DE    29 04 786    6/1980

(Continued)

OTHER PUBLICATIONS
International Search Report.

(Continued)

*Primary Examiner*—Bao Q Vu
*Assistant Examiner*—Nguyen Tran
(74) *Attorney, Agent, or Firm*—Collard & Roc, P.C.

(57) ABSTRACT

The invention relates to a method for controlling the voltage and power of several HF inverters (2), connected in parallel at the output, of an electrically isolated inverter assembly as well as for distributing the load to these HF inverters (2) each consisting of at least one DC-DC converter (3), one intermediate circuit (4) and one DC-AC converter (5), with a command variable ($U_i'$) being formed for each HF inverter (2) so as to preset a nominal value for control of an intermediate-circuit voltage ($U_{ZKi}$) at the intermediate circuit (4) of the HF inverter (2). The load of each HF inverter (2) is determined by a control unit (13) by measuring the current or power required, an internal resistance of the HF inverter (2) is simulated via which internal resistance a virtual voltage drop ($U_{VR}$) is caused which depends on the load determined and is used for controlling the voltage ($U_{ZKi}$) of the intermediate circuit (4) so as to produce a purposive change in the output voltage of each HF inverter (2).

13 Claims, 2 Drawing Sheets

U.S. PATENT DOCUMENTS

Figure 1:
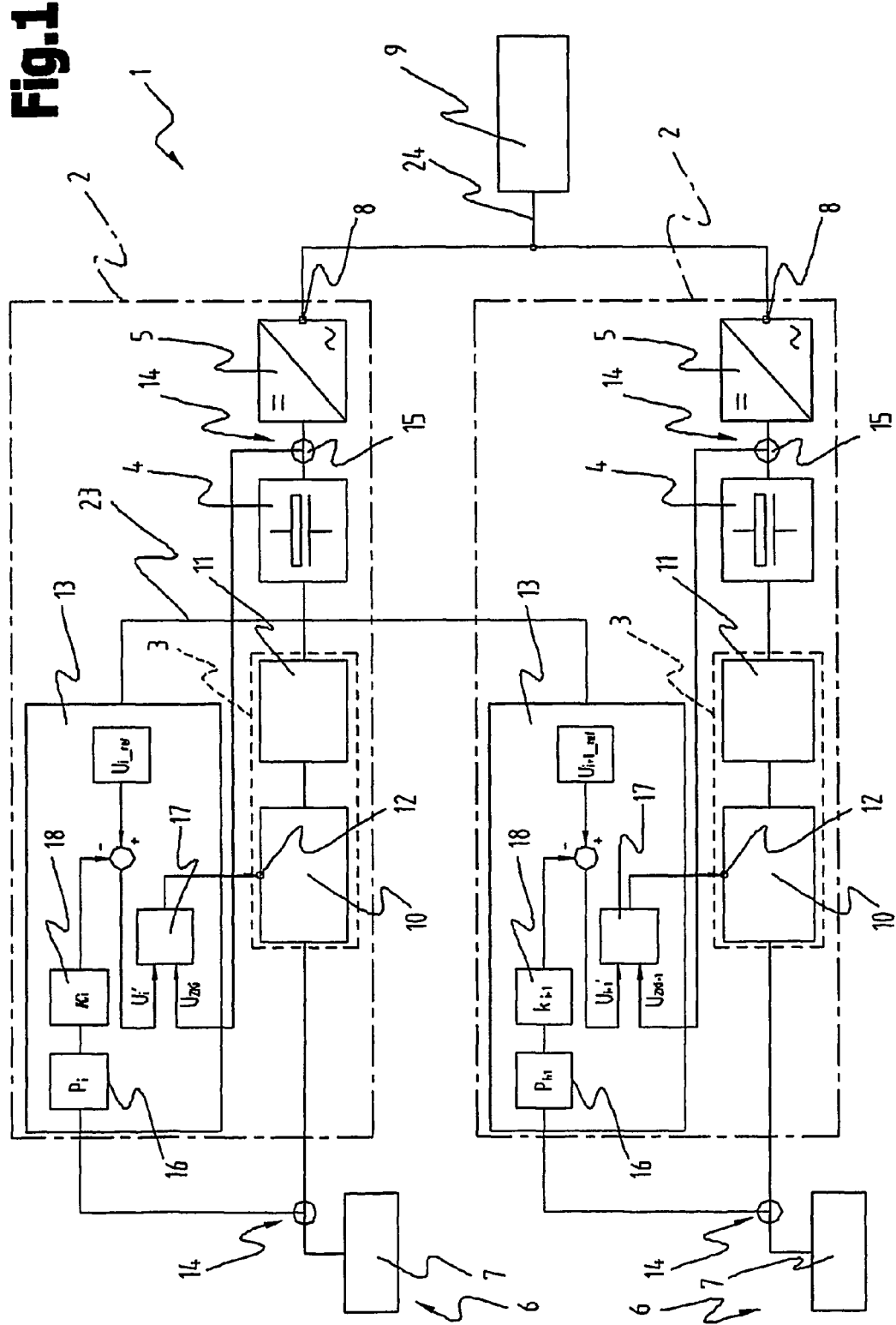

| | | | |
|---|---|---|---|
| 5,257,180 | A | 10/1993 | Sashida et al. |
| 5,418,707 | A | 5/1995 | Shimer et al. |
| 5,473,528 | A | 12/1995 | Hirata et al. |
| 5,566,060 | A | 10/1996 | Shimer et al. |
| 5,610,452 | A | 3/1997 | Shimer et al. |
| 6,381,157 | B2* | 4/2002 | Jensen ............... 363/71 |
| 6,850,425 | B2* | 2/2005 | Tan et al. ............ 363/65 |
| 7,046,533 | B2* | 5/2006 | Takemura et al. ...... 363/65 |
| 7,596,002 | B2* | 9/2009 | Teichmann ............ 363/18 |
| 2005/0093569 | A1 | 5/2005 | Nygren |

FOREIGN PATENT DOCUMENTS

| | | |
|---|---|---|
| DE | 43 12 084 | 10/1993 |
| DE | 692 17 109 | 6/1997 |
| DE | 691 25 462 | 8/1997 |
| EP | 0 492 396 | 7/1992 |
| EP | 0 510 601 | 10/1992 |

OTHER PUBLICATIONS

Van der Broeck, H. et al., "A Simple Method for Parallel Operation of Inverters," Telecommunications Energy Conference, 1998, IEEE, pp. 143-150, XP-010350673. (ISR) (Austrian OA) (Spec, p. 3).

Jiann-Fuh Chen et al., "Modular Parallel Three-Phase Inverter System," Proceedings of the IEEE International Symposium on Industrial Electronics, Band 1, 1995, IEEE Catalog No. 95TH8081, pp. 237-242. (Austrian OA).

* cited by examiner

METHOD FOR CONTROLLING INVERTERS

CROSS REFERENCE TO RELATED APPLICATIONS

This application is the National Stage of PCT/AT2007/000350 filed on Jul. 17, 2007, which claims priority under 35 U.S.C. §119 of Austrian Application No. A1470/2006 filed on Sep. 4, 2006. The international application under PCT article 21(2) was not published in English.

The present invention relates to a method for controlling the voltage and power of several HF inverters, connected in parallel at the output, of an electrically isolated inverter assembly as well as for distributing the load to these high-frequency inverters, each of which consisting of at least one DC-DC converter, one intermediate circuit and one DC-AC converter, with a command variable being formed for each high-frequency inverter so as to preset a nominal value for control of an intermediate-circuit voltage at the intermediate circuit of the high-frequency inverter.

From DE 29 04 786 B1, a method is known for controlling the voltage and load distribution as well as for synchronizing several inverters with interconnected outputs. To this end, a control-variable substitute is formed which is calculated from the sum between the output AC voltage of the inverter, and the product of the deviation from a nominal value of the inverter current at the output, i.e. a cross-current, and a complex impedance. With such a control system, it is disadvantageous that measurement inaccuracies contribute directly to the control, and, thus, a falsified actual value will be preset as a control variable even in case of a slight measurement error, whereby an undesired power will be controlled to at the output. Furthermore, preset of a nominal value for the current, and measurement of the currents at the inverter output are necessary for detecting the cross-current flowing between the inverters, resulting in a greater control complexity which also has negative effects on the reaction time of the control.

Furthermore, a parallel inverter system with several inverters is known from DE 691 25 462 T2 which are connected via a collector such that the load current can be distributed to the inverters. A current-detector circuit is provided which detects a cross-component of a current flowing between the inverters, i.e. the cross-current. The output voltage of the inverter can be controlled via a voltage-control circuit so as to suppress the cross-current component detected. The cross-current is multiplied by a specific impedance so as to generate a nominal voltage signal for the control, with the voltage calculated thereby being subtracted from a reference voltage so as to produce a voltage nominal signal. This procedure involves the drawback of a great control complexity and of an affected control rate since the cross-currents have to be detected to which end a current-detector circuit is necessary which has to detect the deviations from a nominal value to be preset.

DE 692 17 109 T2 describes a system for parallel operation for a plurality of inverters, wherein, again, a load distribution is the case by detecting the cross-current between the inverters via a current-detection circuit, whereupon a cross-current-dependent control variable will be generated. This also involves the above-described drawbacks of complex controller structure, great control complexity, and reaction time of the control.

Parallel circuits of inverter modules are known from U.S. Pat. No. 5,473,528 A, and from the article "A simple method for parallel operation of inverters" (Twentieth International Telecommunications Energy Conference; Oct. 4 to 8, 1998, pp. 143-150) by Van der Broeck, H. et al, wherein the current and/or the power necessary are detected so as to allow for a parallel operation of a greater number of inverter modules.

The object of the present invention resides in creating a method which enables a voltage and power control of several high-frequency inverters (HF inverters) connected in parallel at the output which can be realized with lower control complexity. Furthermore, it is a partial object of the invention to achieve a behavior of the control which is very stable and insensitive to measurement inaccuracies.

The inventive object is achieved in that the load of each HF inverter is determined by a control unit by measuring the current or power required, that an internal resistance of the HF inverter is simulated by the control unit, via which internal resistance a virtual voltage drop is caused which depends on the load determined and is used for controlling the voltage of the intermediate circuit so as to produce a purposive change in the output voltage of each HF inverter. A variable is produced via the simulated resistance which causes a virtual load-dependent voltage drop $U_{VR}$ usable as control variable for stabilizing the inverter system, and for distributing the load. Here, the resistance is deposited in a memory as a value and/or characteristic curve, i.e. it is not realized with a circuit but simulated, and this resistance is used for processing purposes via a program logic so that no physical power loss will be caused by the resistance. Here, it is advantageous that it is not necessary to detect the cross-currents and/or equalizing currents flowing between the HF inverters so as to allow for a control of the output voltage and, furthermore, for a defined load distribution to several HF inverters. This considerably reduces the control complexity, and increases the control rate since the detection and evaluation of cross-currents are omitted. Moreover, it produces the advantage of a control which is insensitive to measurement errors and measurement inaccuracies since in case of a wrongly detected actual value, the flexible presetting of nominal values for the intermediate-circuit voltage and, thus, a matching of the output voltage in the form of a supply-voltage deviation, allows to be automatically controlled back to the range of the physically correct value as a function of the power necessary. As a result, a stable control behavior is obtained, and deviations of the actual values caused by the measurement will be automatically equalized. Such a control also allows for a defined load distribution to the HF inverters connected in parallel, e.g. for a symmetric load distribution. This means that undesired cross-currents between the HF inverters are prevented without the need of knowing variables of a further HF inverter and/or variables present between the HF inverters, e.g. cross-current. Thus, advantageously, each HF inverter can be controlled independently, increasing the control rate, and reducing the control complexity.

A procedure is also advantageous in which the load of the HF inverter at the input of the HF inverter is determined by detecting the input power, since this allows for a reference value to be detected in a simple manner and independently of further HF inverters, said command variable being used as an influencing variable for stabilizing the entire inverter system.

Furthermore, a reduction variable is calculated based on the internal resistance of the HF inverter simulated by the control unit.

Since the reduction variable is calculated from the product of the input power $P_i$ and a matching factor $k_i$, the reduction variable can be adapted to different applications and operation modes by using a suitable matching factor $k_i$.

Here, a procedure is particularly advantageous in which the matching factor $k_i$ is assigned to the type of the HF inverter used, and in which a correspondingly specific matching factor $k_i$ is loaded from a memory of the control unit for calculating the reduction variable.

Furthermore, it is advantageous if a command variable $U_i'$ for presetting the nominal value of the intermediate-circuit voltage $U_{ZKi}$ is detected for each inverter as a function of the reduction variable, since this enables a control of the intermediate-circuit voltage $U_{ZKi}$ using very simple means which control reacts to the load in a flexible manner by the consumer, thus allowing for stabilization and load distribution.

A procedure is also advantageous in which the command variable $U_i'$ is calculated from the difference between a reference voltage $U_{i\_ref}$ and the reduction variable. The above-mentioned advantages of flexible nominal-value presettings are achieved with low effort by reducing the command variable $U_i'$ by a power-dependent value represented by the virtual voltage drop $U_{VR}$.

Compared to cases when complex variables are employed in which the value and phasing has been included, and in which alternating-current variables are used as actual variables the control complexity is advantageously reduced if real variables, in particular direct-current variables, are used for the simulated resistance and/or reduction variable, thus increasing the reaction time and the control rate.

A procedure in which the command variable $U_i'$ for presetting the nominal value of the intermediate-circuit voltage $U_{ZKi}$ is reduced when the load of the HF inverter increases at the output and is increased when the load of the inverter decreases at the output allows for a control of the output power of the HF inverter which is stable and independent of measurement inaccuracies.

A process sequence in which at least one voltage controller and at least one current controller, e.g. a PI controller, arranged downstream thereof are used for controlling the intermediate-circuit voltage $U_{ZKi}$ is of advantage due to the useful and proven means employed. Here, a further command variable $I_i'$ is preset by the voltage controller for control of the nominal current supplied to the intermediate circuit by the current controller so that the intermediate-circuit voltage $U_{ZKi}$ will be set via the nominal current supplied to the intermediate circuit. Thus, via the control loop for current control slave to the control loop for voltage control, the load supplied to the intermediate circuit can be controlled in a manner that the intermediate-voltage $U_{ZKi}$ adjusts in correspondence with the command variable $U_i'$.

A process sequence in which a choke current $I_{ZKi}$ is measured for controlling the intermediate-circuit voltage $U_{ZKi}$ and is supplied to the intermediate circuit is of advantage since these actual variables suffice for realizing the control, and since these variables are assigned uniquely to a single HF inverter, thus minimizing the communication between the HF inverters for realizing the control. Thus, it is not necessary to provide for the complex detection of equalizing currents and/or cross-currents flowing between the HF inverters, reducing control complexity and increasing reaction time.

By the measure that the intermediate-circuit voltage $U_{ZKi}$ and optionally the choke current $I_{ZKi}$ are fed back to the voltage controller, and optionally to the current controller in each HF inverter for creating a control deviation within the respective control circuit, an independent control of the output power of each individual HF inverter is allowed for, with a desired load distribution to the HF inverters being effected at the same time.

A procedure in which a proportional output AC voltage is generated via the intermediate-circuit voltage $U_{ZKi}$, in particular via the DC-AC converter is likewise of advantage since the effective output AC voltage is also controlled via the respective control of the intermediate-circuit voltage $U_{ZKi}$, wherein the control can advantageously take place with direct-current variables only.

By the measure that at least when the parallel operation is started, the HF inverters are synchronized via a line by means of a signal and/or pulse it is ensured that the sinus alternating voltage at the outputs of several HF inverters is zero-crossing-synchronous, thus preventing cross-currents between the HF inverters due to potency differences based on different phasing of the AC voltages.

Here, it is also advantageous if time-uncritical data, e.g. error or diagnosis signals, performance parameters, state variables of the control, and the like, are furthermore transferred via the line since operational states, e.g. a visualization and/or logging of parameters or the like, can be evaluated and further processed, this being unnecessary for functionality of the control, thus not affecting the control lot.

If the HF inverter is used as an electrically-isolated inverter for supplying a consumer decoupled from the public power grid, the tolerances accepted for the open grid as regards voltage deviations for controlling the output voltage may be consulted as a variation range, thus advantageously allowing for variability of the intermediate-circuit voltage $U_{ZKi}$ and/or the output voltage within this variation range without affecting functionality of the consumer.

A further advantageous method variant consists in effecting the control in a digital manner, and in recalling the components of the control circuits from a memory of the control unit, and in processing said components by a computing circuit, in particular a microprocessor, thus allowing for the control to be realized in a very cost-effective and flexible way.

The present invention will be explained in more detail by way of the enclosed schematic drawings.

Figure 2:
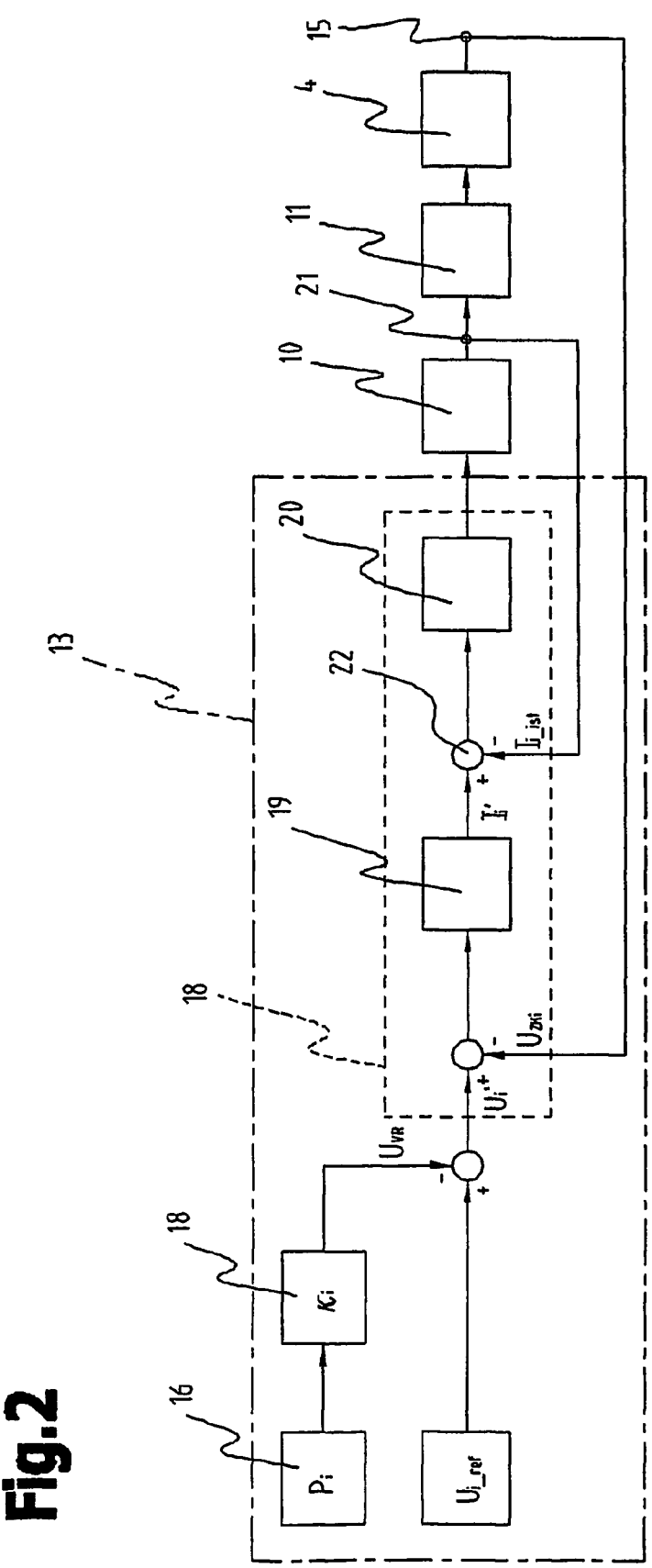

Therein:

FIG. 1 shows a block diagram of an assembly of two high-frequency inverters with the components essential for conducting the inventive method; and FIG. 2 shows a block diagram of a possible embodiment variant of the controller structure for controlling an HF inverter of an inverter system.

In FIG. 1, a usual structure of an inverter system 1 is shown with several—in this case two—HF inverters 2 (outlined with dotted-and-broken lines) in particular high-frequency inverters connected in parallel at the output. Since the individual components, and structural units, and functions of HF inverters 2 have already been known from the prior art, they will not be addressed in detail in the following.

The HF inverter 2 comprises, e.g., a DC-DC converter 3 (outlined with broken lines), an intermediate circuit 4, and a DC-AC converter 5. Here, the HF inverter 2 has a particular property, i.e. they have a very low resistance, compared to usually used 50 Hz inverters. A power source 6, or a power generator, is connected at one input of the DC-DC converter 3, said power source being formed by one or several accumulator(s) 7 connected in parallel and/or in series e.g. Here, as schematically illustrated and known from the prior art, it is possible to charge the accumulators 7 via solar modules 7a and a charge controller 7b. The DC-AC converter 5 is connected to one or several electric consumers 9, e.g. a refrigerator, a radio unit, etc., at an output 8. Preferably, the inverter system 1 is used as an electrically-isolated inverter for supplying consumers 9 decoupled from the public power grid, with said consumers needing a power supply as is the case with a public alternating-voltage grid. The use of several HF inverters 2 may provide more power for operating the consumers 9, on the one hand. The redundant structure due to the use of several HF inverters 2 allows for breakdown probabilities of the inverter system 1 to be reduced, on the other hand, thus enabling power supply of important consumers 9 in a breakdown-safe manner.

The DC-DC converter 3 is comprised of at least one power electronics 10 and one transformer as well as one AC-DC converter (block 11). The power electronics 10 has a circuit means which is controlled and/or clocked at a control input 12 such that there is the possibility to set the energy supplied to the transformer in block 11, e.g. by means of pulse-width modulation (PWM) or phase-shift processes or the like of the control signal at the control input 12. The intermediate circuit 4 is composed of one or several capacitor(s), in particular electrolyte capacitors. The intermediate circuit 4 serves for storing energy, and this is why the same is charged to an intermediate-circuit voltage $U_{ZKi}$ from which an AC voltage is generated via the AC-DC converter 5 at the output 8. The DC-AC converter 5 is comprised of an appropriate converter which converts DC voltage into AC voltage, so as to allow for the desired AC voltage to be produced for the consumer 9 at the output 8. Further components and structural units, e.g. filter wirings, smoothing capacitors, etc., are not illustrated in the exemplary embodiment shown.

Furthermore, the HF inverter 2 has a controller or control unit 13 which may be formed by, e.g. a microprocessor, a microcontroller or a computer. The individual structural units, in particular of the circuit elements included therein, may be controlled appropriately via the control unit 13. To this end, the individual control sequences are stored in the control unit 13 via appropriate software programs and/or data and/or characteristic curves. Moreover, one or several measurement system(s) 14 is (are) provided in addition to control unit 13 for detecting the current and the voltage at the most different points of the inverter system 1.

The structure shown in FIG. 1 allows for a method for controlling the voltage and current of the HF inverters 2, connected in parallel at the outputs 5, to be realizable so that it is possible to perform a defined distribution of the power required by the consumer(s) 9 to the individual HF inverters 2. Here, there is the possibility to design the HF inverters 2 to have the same structure so as to enable a symmetrical and even load distribution between the HF inverters 2. Furthermore, HF inverters 2 of different types, e.g. of different power classes and/or nominal power may be used in parallel operation, wherein in this case an appropriate proportional load distribution, in particular a nominal-power-dependent load distribution, to the HF inverters 2 is effected. For example, in case of an inverter system 1 with two HF inverters 2 where the second HF inverter 2 is operated with doubled nominal power compared to the first HF inverter 2, the inverter system 1 is controlled such that the second HF inverter 2 also supplies the double power to the consumer 9.

In the following, the inventive method will be explained by way of combining FIGS. 1 and 2, FIG. 2 showing a block diagram of the control system the invention is based on. Here, FIG. 2 illustrates the block diagram of the control of an individual HF inverter 2, with said block diagram pertaining for each HF inverter 2 of the inverter system 1.

An intermediate-circuit voltage $U_{ZKi}$ applied to the output of the intermediate circuit 4, is measured at the HF inverter 2 via a measurement system 14 designed as a voltage sensor 15. The index i represents one of the HF inverters 2 of the inverter system 1. The intermediate-circuit voltage $U_{ZKi}$ is used as the actual variable for controlling the power at the output 8 of the HF inverter 2, and it is thus deposited in the control unit 13 after each sampling procedure.

Furthermore, the input power $P_i$ supplied to the HF inverter 2 via the energy source 6 is detected at a power-detection means 16, this being realizable via a measurement system 14 comprised of current and voltage sensors, and via a computational logic for power calculation. The input power $P_i$ at the HF inverter 2 is determined by the power output at the output 8 such that a change in the power output of the inverter system 1 has an effect on the input of the HF inverter 2.

To perform a defined power distribution to the HF inverters 2 at the outputs 8, a nominal value and/or command variable $U_i'$ is preset for the intermediate-circuit voltage $U_{ZKi}$ supplied to the input of a controller 17. The controller 17 controls such that the current applied to the intermediate circuit 4 will be changed after a difference and/or control deviation has occurred between the command variable $U_i'$ and the present intermediate-circuit voltage $U_{ZKi}$, whereby the intermediate-circuit voltage $U_{ZKi}$ will adjust as desired. Here, the members and components possibly present in the control path 18, e.g. comparators, signal limiters, filters, etc., are not addressed in detail here since they have already been known to the skilled artisan in the field of control technology.

According to the invention, it is provided that the command variable $U_i'$ is variable particularly within a certain range of variation, and is set as a function of the load of the HF inverter 2 by the consumer 9 at the output 8. Here, the range of deviation is set such that the voltage variance present at the output 8 lies within the tolerances for a consumer 9. Preferably, the range of variation corresponds to the tolerated maximum voltage variations of the public power grids. Here, the range of variation may be between 240V~ and 220V~, e.g.

Preferably, the load of the HF inverter 2 is determined by a power-detection means 16 detecting the input power $P_i$ at the input of the HF inverter 2. Thus, the command variable $U_i'$ can be changed and varied by the control unit 13, as a function of the input power $P_i$. In particular, a reference voltage $U_{i\_ref}$ is preset for this purpose which is reduced by a value dependent on the input power $P_i$. This value may be regarded as a simulated and/or virtual resistance since a voltage drop $U_{VR}$ is simulated via this value by generating a reduction variable, with said voltage drop physically not occurring since the HF inverters 2 have a very low internal resistance having no substantial effect. Thus, the command variable $U_i'$ is formed from the difference between a reference voltage $U_{i\_ref}$ and a virtual voltage drop $U_{VR}$ according to $U_i'=U_{i\_ref}-U_{VR}$. During control, the reference voltage $U_{i\_ref}$ is preferably kept at a constant value, wherein the reference voltage $U_{i\_ref}$ can be preset to be identical for all HF inverters 2 used in the inverter system 1. Yet, there is also the possibility that the value of the reference voltage $U_{i\_ref}$ depends on the type of the HF inverter 2 used, and that the reference voltage $U_{i\_ref}$ is preset independently and optionally differently for each HF inverter 2 in the inverter system 1.

The reduction variable and/or the virtual voltage drop $U_{VR}$ is preferably proportional to the input voltage $P_i$ detected at the power-detection means. An evaluation unit 18, in particular a multiplication unit or deposited characteristic curve, is provided for calculating the reduction variable $U_{VR}$, said evaluation unit preferably including a matching factor $k_i$ preferably specific for the HF inverter 2 so that the reduction variable $U_{VR}$ will be calculated by multiplication of the input power $P_i$ by the matching factor $k_i$. Here, the reduction variable $U_{VR}$ and/or the matching factor $k_i$ preferably is (are) only a real variable(s).

Accordingly, the command variable $U_i'$ depends on the reduction variable $U_{VR}$, rendering flexible the nominal-value presetting of the control. Such a procedure in which the intermediate-circuit voltage $U_{ZKi}$ is preset by the power at the output 8 and/or at the input of the HF inverter 2 advantageously allows for a power control at the output 8 which involves little expenditures and is very quick, wherein it is also possible to perform a defined distribution, in particular a symmetrical distribution, of load to the HF inverters 2.

For example, if the load by the consumer 9 is increased, more current will be taken from the HF inverters 2 after short-term discharge processes at the intermediate circuits 4, with the intermediate voltage $U_{ZKi}$ being kept at a constant level. Only after a higher input power due to the higher current consumption has been detected, the command variable $U_i'$ will be reduced by the reduction variable $U_{VR}$ so that a lower intermediate-circuit voltage $U_{ZKi}$ will adjust. This procedure is conducted in parallel at all HF inverters 2 so that the load on the HF inverters 2 is distributed symmetrically or proportionally as a function of the respective nominal power since the same intermediate-circuit voltage $U_{ZKi}$ adjusts at the intermediate circuit 4 of each HF inverter 2.

The intermediate-circuit voltage $U_{ZKi}$ is preferably preset by a voltage controller 10 and at least one current controller 20 in the controller 17. A further command variable $I_i'$ is output at the output by the voltage controller 19, with said command variable presetting the nominal value of the current supplied in the intermediate circuit 4. A further measurement system 14 is formed by a current sensor 21 which detects the actual current in the power electronics 10 fed back to a subtracting means 22 or comparator. At the subtracting means 22, a control deviation for the input of the current controller 20 is produced from the difference between the command variable $I_i'$ and the actual current. Accordingly, the load and/or current is determined by the current controller 20, said current being supplied to the intermediate circuit 4 so as to charge the same to the intermediate-circuit voltage $U_{ZKi}$.

Accordingly, the statement can be made that in case of an electrically-isolated inverter assembly for controlling voltage and power of several HF inverters 2 connected in parallel at the output, for distributing the load to these HF inverters 2, each of the latter consists of at least one DC-DC converter 3, an intermediate circuit 4 and a DC-AC converter 5, a command variable $U_i'$ is generated for each HF inverter 2 for presetting a nominal value for controlling an intermediate-circuit voltage $U_{ZKi}$ at the intermediate circuit 4 of the HF inverter 2. The current or power necessary is detected at each HF inverter 2 by a control unit 13, whereupon the intermediate-circuit voltage $U_{ZKi}$, and thus the output voltage, will be changed as a function of the load of the HF inverter 2 so as to produce a purposive variation at the output of the HF inverter 2.

The purposive production of a supply-voltage variation at the output of the HF inverters 2 allows for a power matching of the HF inverters 2 connected in parallel to be enabled in a simple manner in case of HF inverters 2 with a very low internal resistance, thus avoiding corresponding cross-currents, as they form in case of uneven power distributions and/or load distributions. For example in case of uneven load distribution, to put it simply, this is achieved by one HF inverter 2 supplying more current than the other. Thus, a change in the output voltage is caused in the HF inverter 2, which supplies more current, by that control unit 13 via the simulated internal resistance, i.e. the output voltage is reduced. Now, the other HF inverter 2 supplies more current since the output voltage is still the same or higher so that subsequently a change in the output voltage, i.e. a supply-voltage variation, will be caused also with this HF inverter 2 due to the employed control via the simulated internal resistance. Thus, due to the control employed, a permanent matching of the output voltage is performed in the form of a supply-voltage variation so that an equal output-voltage drop of the HF inverters connected in parallel will be the case, whereby both HF inverters 2 will supply the same amount of current and are loaded in the same manner. This control is also effected in reverse direction, i.e. if less power is required, the output voltage will be increased so that, again, both HF inverters 2 will be loaded equally. This control elucidates that each HF inverter 2 controls independently, thus making the use of additional cross-current measurement systems, as required in the prior art, unnecessary.

Thus, any number of HF inverters 2 can be interconnected without additional expenditure. Only in case of adding such an electrically-isolated inverter assembly, the new HF inverters 2 have to be connected via the line 23 for the zero-crossing signal.

A further advantage is also achieved by purposively producing a supply-voltage variation, that is, that an overload protection for the HF inverters can be simply formed. This may be effected, e.g., by setting an upper and lower output-voltage threshold value, i.e. for the supply-voltage variation produced, for the HF inverters 2 so that in case of too high a load, the HF inverters 2 cannot reduce the output voltage to be below the threshold value since otherwise too much energy would be supplied by the HF inverters 2, which would lead to too high a load of the HF inverters 2.

It shall be noted that prior-art control systems, e.g. PI controllers, may be used as a voltage controller 19 and/or current controller 20.

The energy amount supplied to the intermediate circuit 4 may be controlled via PWM, wherein the voltage is converted via the high-frequency transformer in block 11 in a manner that the intermediate circuit 4 is charged to an intermediate-circuit voltage $U_{ZKi}$ of from about 300V to 500V, in particular of about 400V. This intermediate-circuit voltage $U_{ZKi}$ is converted via the DC-AC converter 5 into an AC voltage applied to the output 8, e.g. a supply voltage of 230V and 50 Hz, wherein prior-art methods and/or devices, e.g. inverter bridges or the like, may be used for this purpose. Here, the effective value of the AC voltage at the output 8 is proportional to the value of the intermediate-circuit voltage $U_{ZKi}$. Voltage variations can occur at the output due to the variable intermediate-circuit voltage $U_{ZKi}$ which lie within the tolerances of the public power grid. In case of consumers 9 with high initial currents, this is even advantageous since the AC voltage at the outputs 8 is lower during initiation due to the high load, thus counteracting a short-term overload of the inverter system 1.

The inverters 2 of the inverter system 1 are interconnected via a line 23, e.g. an optical waveguide, for signal and/or data exchange. The inverters 2 are synchronized via this line 23 in a manner that the sinusoidal AC voltages at the outputs 8 of the inverters 2 are in the same phasing, i.e. have the same zero-crossings. This synchronization may be effected, e.g. via an initiating pulse via which the generation of the AC voltage at the output 8 of each inverter 2 is initiated at the same time. This synchronization of the zero-crossings of the AC voltages at the outputs 8 in terms of time prevents equalizing and/or cross-currents caused by uneven phasing.

Furthermore, there is the possibility of further time-uncritical data, e.g. error or diagnosis signals, performance parameters, state variables, etc., to be transferred via the line 23. Thus, further functions can be realized in the inverter system 1, e.g. a visualization or logging of parameters, yet having no influence on the control for energy supply of a consumer 9.

It shall be noted that the individual functional blocks shown in FIGS. 1 and 2 may be at least partially deposited as a computational logic and/or software in a memory of the control unit 13, this being particularly true for the controller 17, the evaluation unit 18, and parts of the power-detection means 16. In this case, the power output at the outputs 8 of the inverters 2 is digital-controlled, allowing for a flexible and cost-effective controller concept.

Moreover, the values deposited in the memory of the control unit 13 can thus easily be changed, and/or several configurations of an inverter system 1 can be deposited. For example, it is possible to deposit different matching factors $k_i$, each of which is specific for one type and/or power class of an inverter 2 and which are loaded from the memory as a function of the type of inverter 2 used. Thus, the power output at the output 8 of the inverter 2 can be determined by presetting a matching factor Ki assigned to the inverter 2, thus enabling a heterogeneous structure of the inverter system 1 with different types of inverters 2 with correspondingly different nominal power.

The type of an inverter 2 may be recognized by the control unit 13, e.g. automatically in a diagnosis mode, or may be set manually by user inputs, thus selecting the appropriate matching factor $k_i$.

Finally, it shall be mentioned that the inverter system 1 is not limited to two HF inverters 2 for supply of the consumer 9 but a number of HF inverters 2 at the output 8 may be operated in parallel at a collector 24 leading to the consumer 9.

The individual embodiments which are shown in FIGS. 1 and 2, and/or the parts which belong to the description of these figures may constitute the subject matter of independent and inventive solutions. The respective inventive objects and solutions are to be learned from the detailed descriptions of these figures.

The invention claimed is:

1. A method for controlling the voltage and power of several HF inverters (2), connected in parallel at the output, of an electrically isolated inverter assembly as well as for distributing the load to these HF inverters (2) each consisting of at least one DC-DC converter (3), one intermediate circuit (4) and one DC-AC converter (5), with a command variable ($U_i'$) being formed for each HF inverter (2) so as to preset a nominal value for control of an intermediate-circuit voltage ($U_{ZKi}$) at the intermediate circuit (4) of the HF inverter (2), wherein the load of each HF inverter (2) is determined by a control unit (13) at the input of each HF inverter (2) by measuring the input power ($P_i$), that a virtual internal resistance of each HF inverter (2) is simulated by each control unit (13), via which internal resistance a virtual voltage drop ($U_{VR}$) is caused which depends on the load determined, which virtual voltage decrease ($U_{VR}$) is used for controlling the voltage ($U_{ZKi}$) of the intermediate circuit (4) so as to produce a purposive change in the output voltage of each HF inverter (2).

2. The method according to claim 1, wherein a reduction variable is calculated based on the internal resistance of each HF inverter (2) simulated by the control unit (13).

3. The method according to claim 2, wherein the reduction variable is calculated from the product of the input voltage ($P_i$) and a matching factor ($K_i$).

4. The method according to claim 3, wherein the matching factor ($K_i$) is assigned to the type of the HF inverter (2) used, and that a correspondingly specific matching factor ($K_i$) is loaded from a memory of the control unit (13) for calculating the reduction variable.

5. The method according to claim 2, wherein a command variable ($U_i'$) for presetting the nominal value of the intermediate-circuit voltage ($U_{ZKi}$) is detected for each HF inverter (2) as a function of the reduction variable.

6. The method according to claim 5, wherein the command variable ($U_i'$) is calculated from the difference between a reference voltage ($U_{i\_ref}$) and the reduction variable.

7. The method according to claim 2, wherein real variables, in particular direct-current variables, are used for the simulated resistance and/or reduction variable.

8. The method according to claim 5, wherein the command variable ($U_i'$) for presetting the nominal value of the intermediate-circuit voltage ($U_{ZKi}$) is reduced when the load of the HF inverter (2) increases at the output (8) and is increased when the load of the inverter (2) decreases at the output (8).

9. The method according to claim 1, wherein a voltage controller (19) and at least one current controller (20), e.g. one PI controller each, arranged downstream thereof are used for controlling the intermediate-circuit voltage ($U_{ZKi}$), wherein a further command variable ($I_i'$) is preset by the voltage controller (19) for control of the nominal current supplied to the intermediate circuit (4) by the current controller (20) so that the intermediate-circuit voltage ($U_{ZKi}$) will be set via the nominal current supplied to the intermediate circuit (4).

10. The method according to claim 1, wherein a choke current ($I_{ZKi}$) is measured for controlling the intermediate-circuit voltage $U_{ZKi}$ and is supplied to the intermediate circuit (4).

11. The method according to claim 9, wherein the intermediate-circuit voltage ($U_{ZKi}$) and optionally the choke current ($I_{ZKi}$) are fed back to the voltage controller (19) and optionally to the current controller (20) for creating a control deviation.

12. The method according to claim 1, wherein at least when the parallel operation is started, the HF inverters (2) are synchronized via a line (23) by means of a signal and/or pulse.

13. The method according to claim 12, wherein furthermore time-uncritical data, e.g. error or diagnosis signals, performance parameters, state variables, and the like, are transferred via the line (23).

* * * * *